United States Patent
Ackers

(10) Patent No.: US 12,305,262 B2
(45) Date of Patent: May 20, 2025

(54) TITANIUM ALLOYS FOR RAPID SOLIDIFICATION PROCESSING

(71) Applicant: Oerlikon AM GmbH, Feldkirchen (DE)

(72) Inventor: Albert Michael Ackers, Munich (DE)

(73) Assignee: Oerlikon AM GmbH, Feldkirchen (DE)

( * ) Notice: Subject to any disclaimer, the term of this patent is extended or adjusted under 35 U.S.C. 154(b) by 776 days.

(21) Appl. No.: 17/598,853

(22) PCT Filed: Mar. 27, 2020

(86) PCT No.: PCT/EP2020/058761
§ 371 (c)(1),
(2) Date: Sep. 27, 2021

(87) PCT Pub. No.: WO2020/193763
PCT Pub. Date: Oct. 1, 2020

(65) Prior Publication Data
US 2022/0184704 A1    Jun. 16, 2022

(30) Foreign Application Priority Data

Mar. 28, 2019   (DE) .......................... 102019002232.7

(51) Int. Cl.
| | | |
|---|---|---|
| *C22C 14/00* | (2006.01) | |
| *B22F 10/25* | (2021.01) | |
| *C22C 1/04* | (2023.01) | |
| *B33Y 10/00* | (2015.01) | |
| *B33Y 70/00* | (2020.01) | |
| *B33Y 80/00* | (2015.01) | |

(52) U.S. Cl.
CPC .............. *C22C 14/00* (2013.01); *B22F 10/25* (2021.01); *C22C 1/0458* (2013.01); *B22F 2301/205* (2013.01); *B22F 2303/01* (2013.01); *B22F 2998/10* (2013.01); *B22F 2999/00* (2013.01); *B33Y 10/00* (2014.12); *B33Y 70/00* (2014.12); *B33Y 80/00* (2014.12)

(58) Field of Classification Search
CPC ..................................................... C22C 14/00
See application file for complete search history.

(56) References Cited

U.S. PATENT DOCUMENTS

| | | | | |
|---|---|---|---|---|
| 2018/0258512 | A1* | 9/2018 | Sing ........................ | B33Y 10/00 |
| 2020/0239983 | A1* | 7/2020 | Sun ......................... | B33Y 70/00 |
| 2022/0025488 | A1* | 1/2022 | Alabort Martinez ... | C22F 1/183 |

FOREIGN PATENT DOCUMENTS

| | | |
|---|---|---|
| CN | 108486408 A | 9/2018 |
| JP | H03 257130 A | 11/1991 |
| JP | H05148567 A | 6/1993 |
| JP | 2018115386 A | 7/2018 |
| WO | 2012021257 A2 | 2/2012 |
| WO | 2018162919 A1 | 9/2018 |

OTHER PUBLICATIONS

Written Opinion for PCT Application No. PCT/EP2020/058761, mailed Jan. 1, 2023, 5 pages.
Database WPI, Week 201871, Thomson Scientific, London, GB; AN 2018-712621, XP002798920, & CN 108 486 408 A (Shandong Chuangrui Health Medical Technology Co Ltd) Sep. 4, 2018 (abstract).

* cited by examiner

*Primary Examiner* — Christopher S Kessler

(57) ABSTRACT

An additive manufacturing method for the production of components comprising the steps of: (a) providing and melting a metal based powder, (b) merging the molten particles with each other and with their underground thereby forming merged material, and (c) cooling and thereby solidifying the merged material, characterized in that the metal based powder is a Ti based powder comprising at least Ta, Fe and i) Sn and/or ii) Nb and Zr.

15 Claims, 10 Drawing Sheets

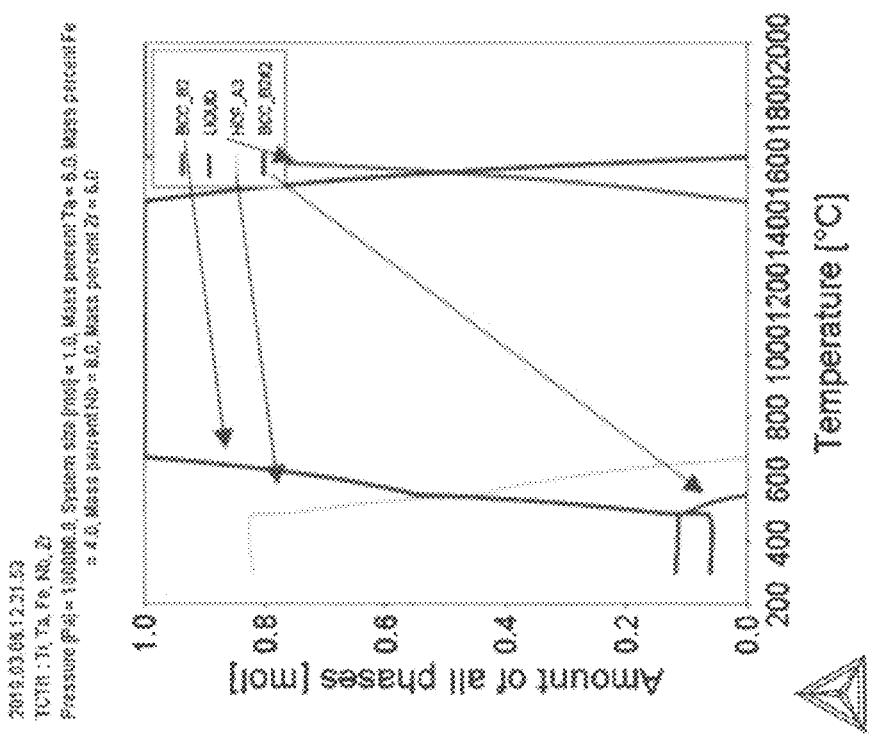

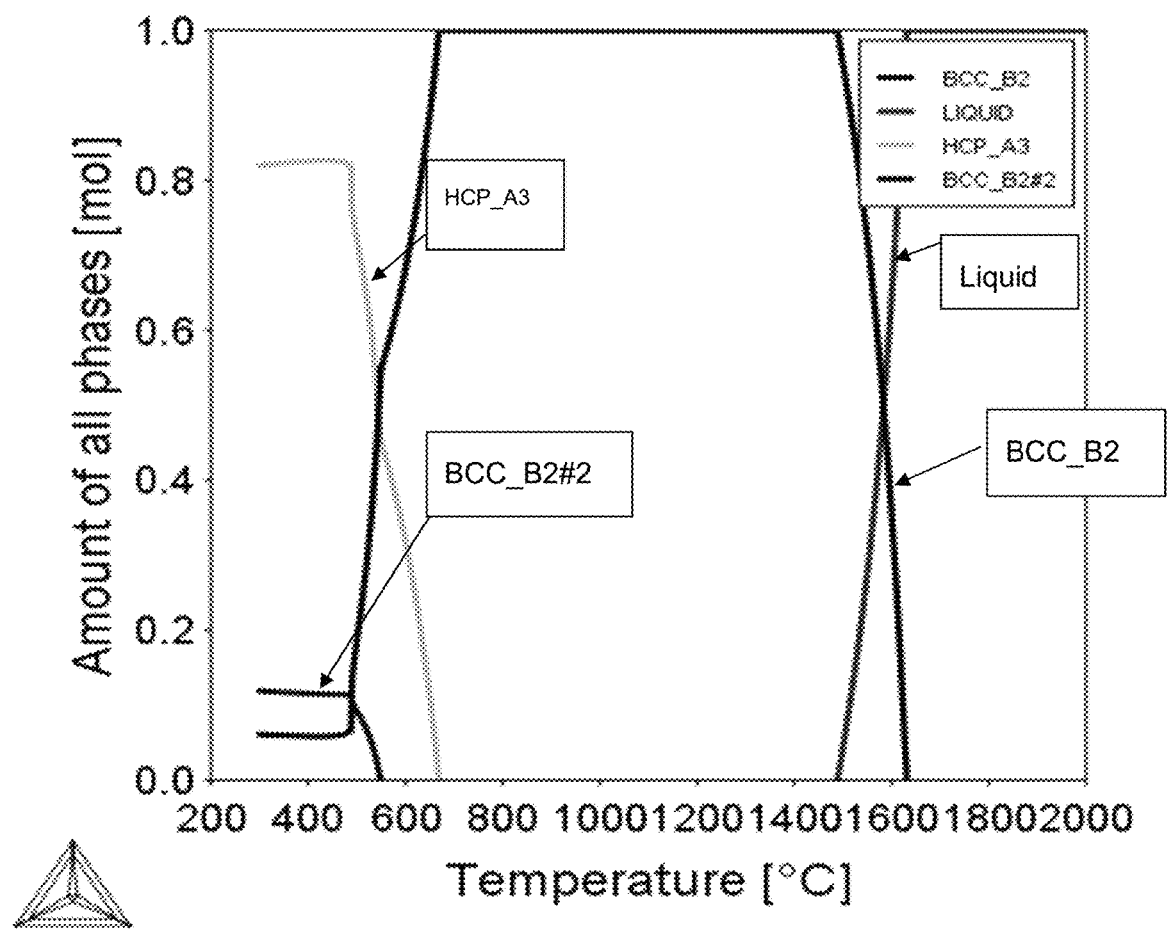
Figure 1b: TTFNZ Ti-6Ta-4Fe-8Nb-6Zr (Thermodynamic equilibrium)

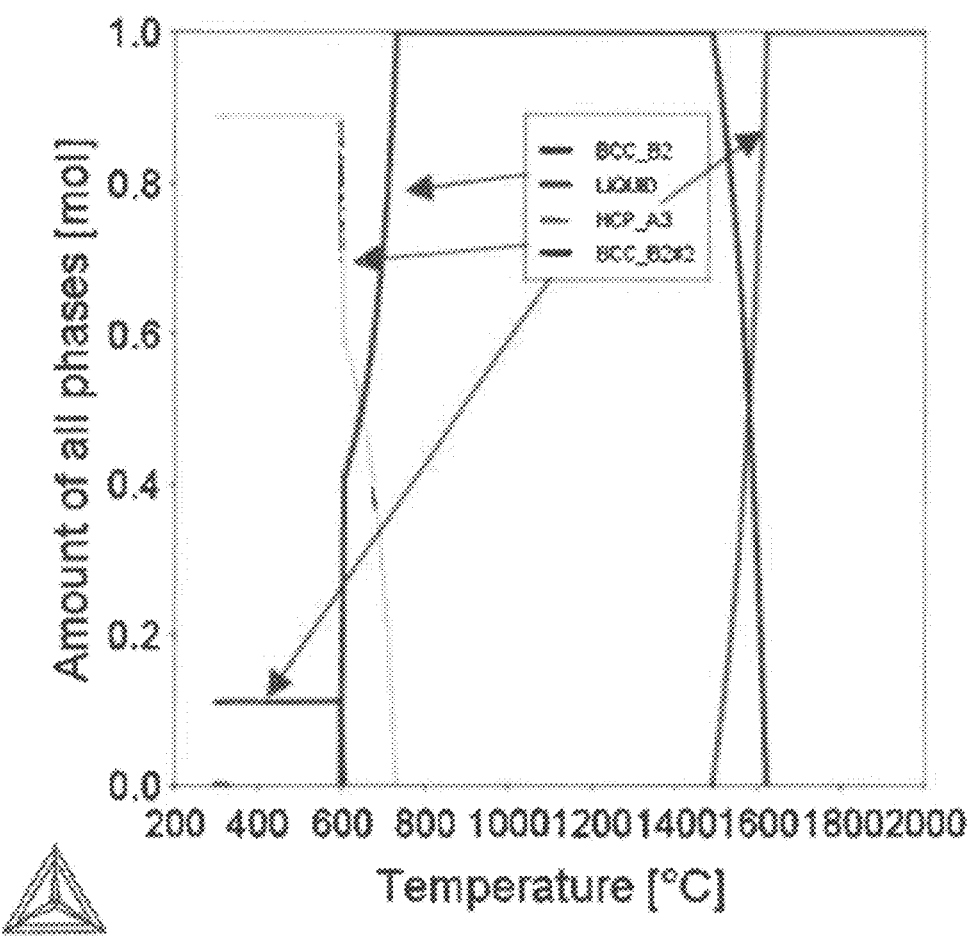

Figure 2b: TTFS (Thermodynamic equilibrium)
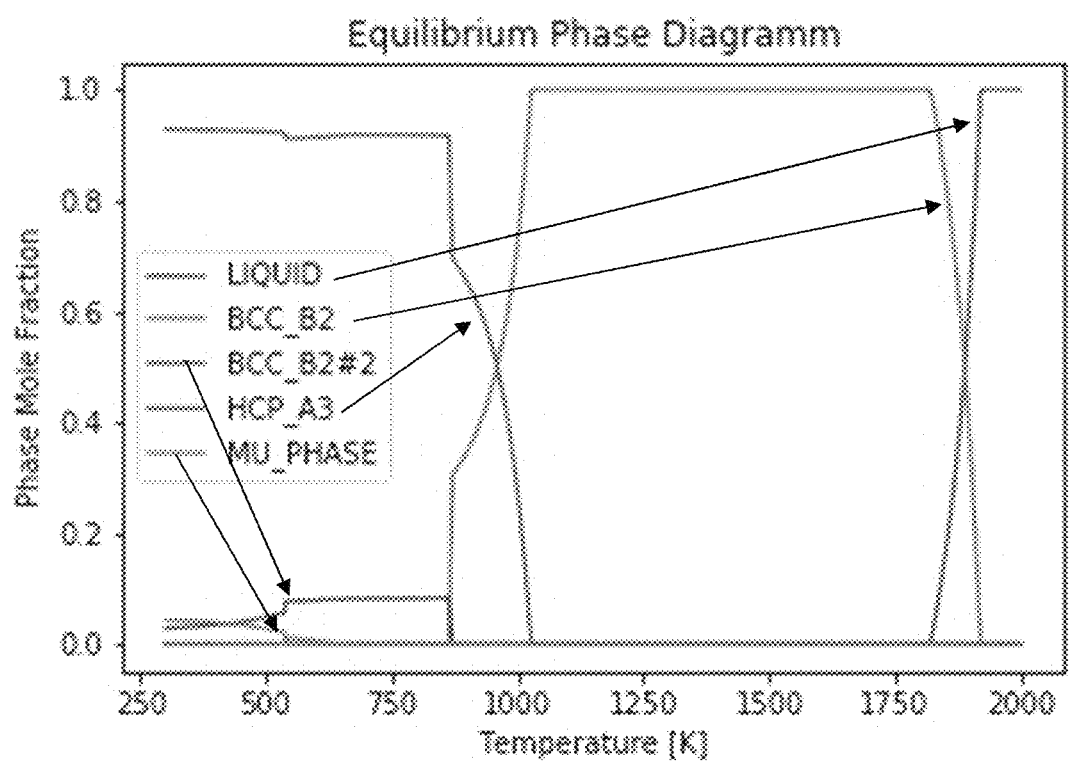

Figure 3: Microstructure of TTFNZ after NADFAM/AM conditions

Post NADFAM: 66% Beta und 34% Alpha

Figure 3b: Microstructure of TTFNZ after rapid solidification conditions + heat treatments
1) Microstructure of TTFNZ after rapid solidification (arc melting): 98% β und 2% α; Hardness = 350 HV1
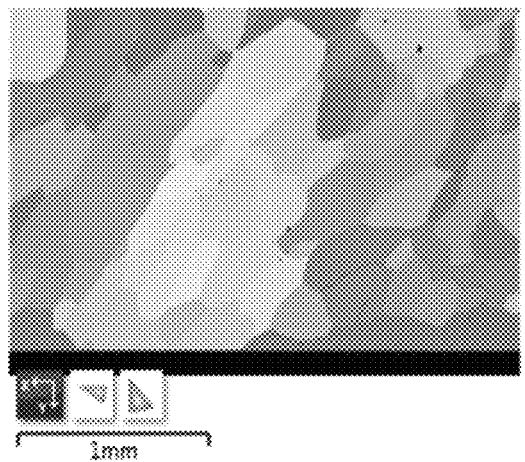
2) Post AM + 10 times laser re-melting of the top surface: 66% β und 34% α; Hardness = 440 HV1
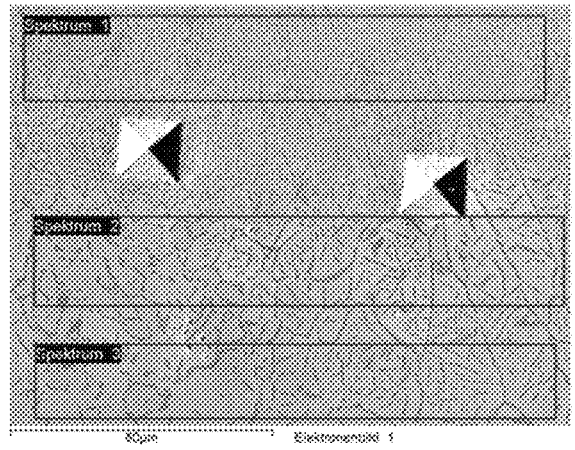
3) Post Rapid Solidification + heat treatment > 500°C: 45% β und 55% α; Hardness = 410 HV1
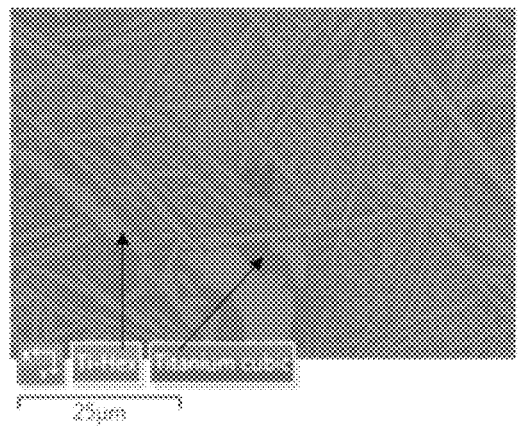

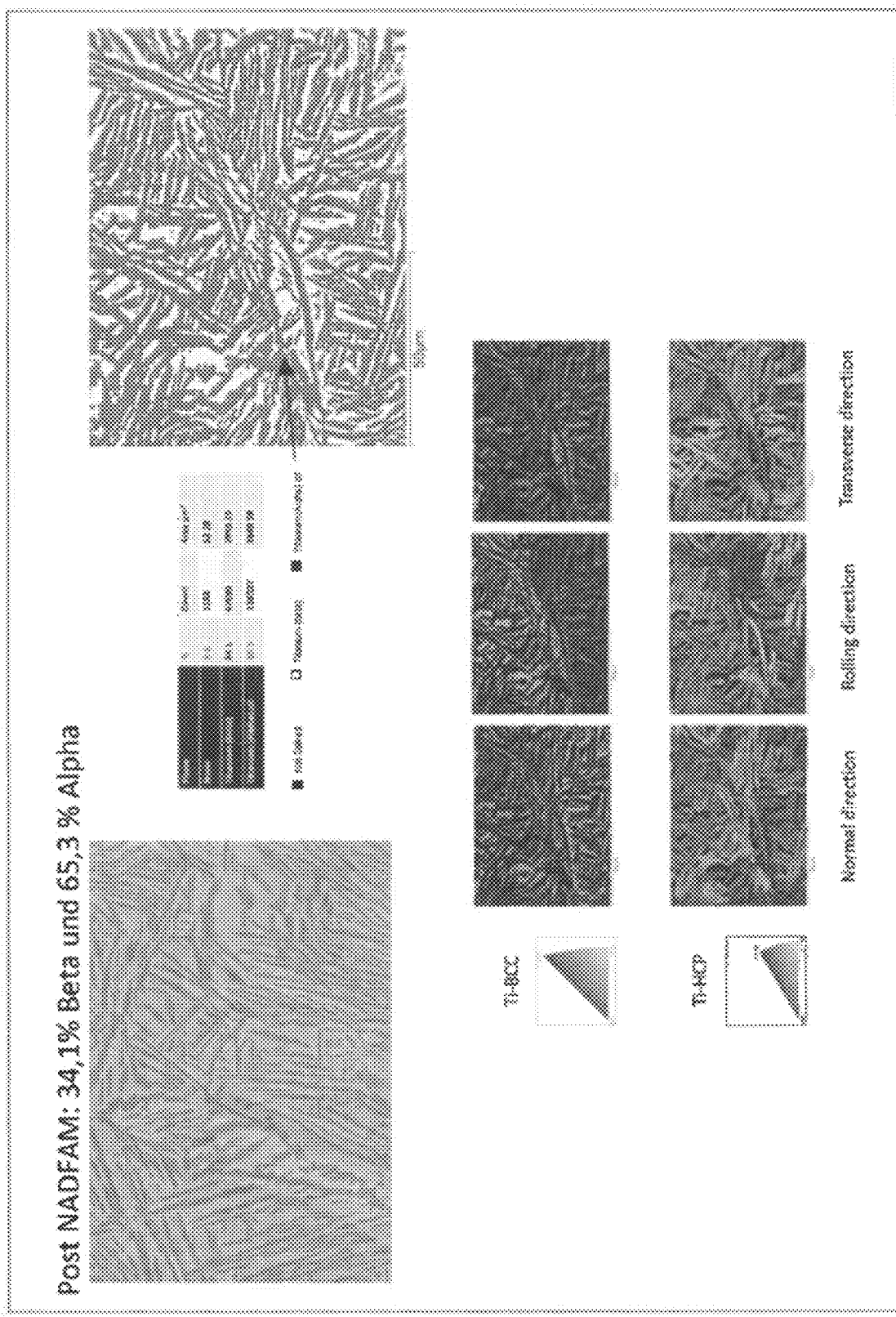

Figure 4b: Microstructure of TTFS after rapid solidification conditions + heat treatments
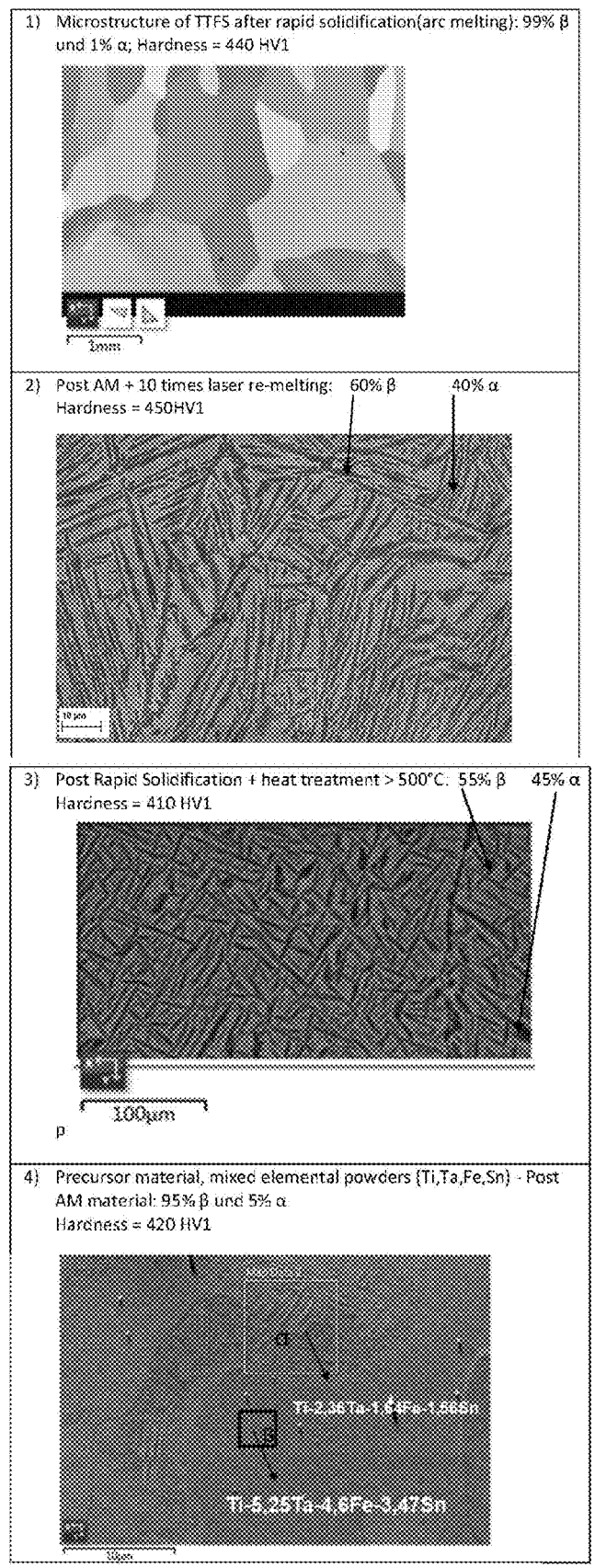

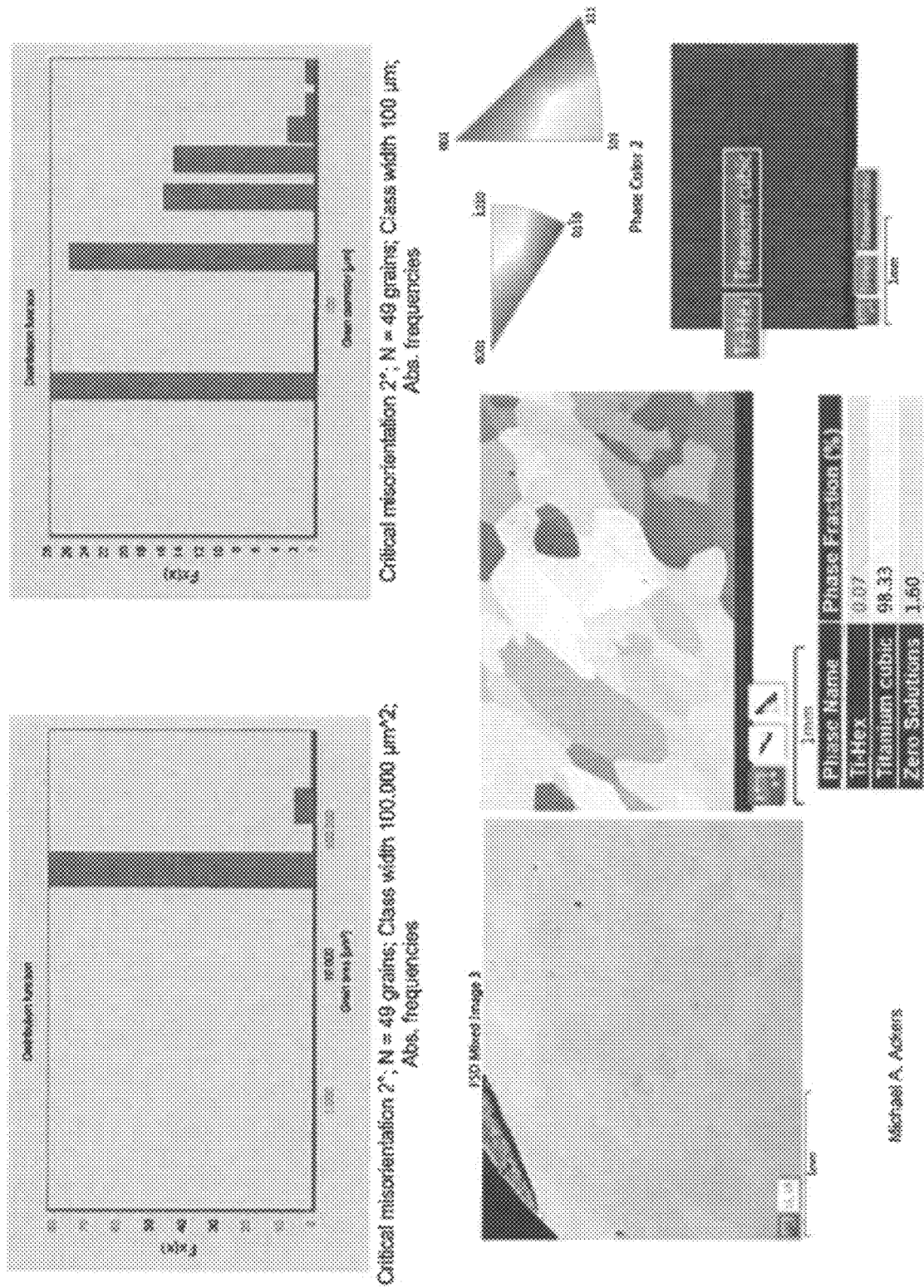
Figure 5: Microstructure of TTFNZ after arc melting conditions

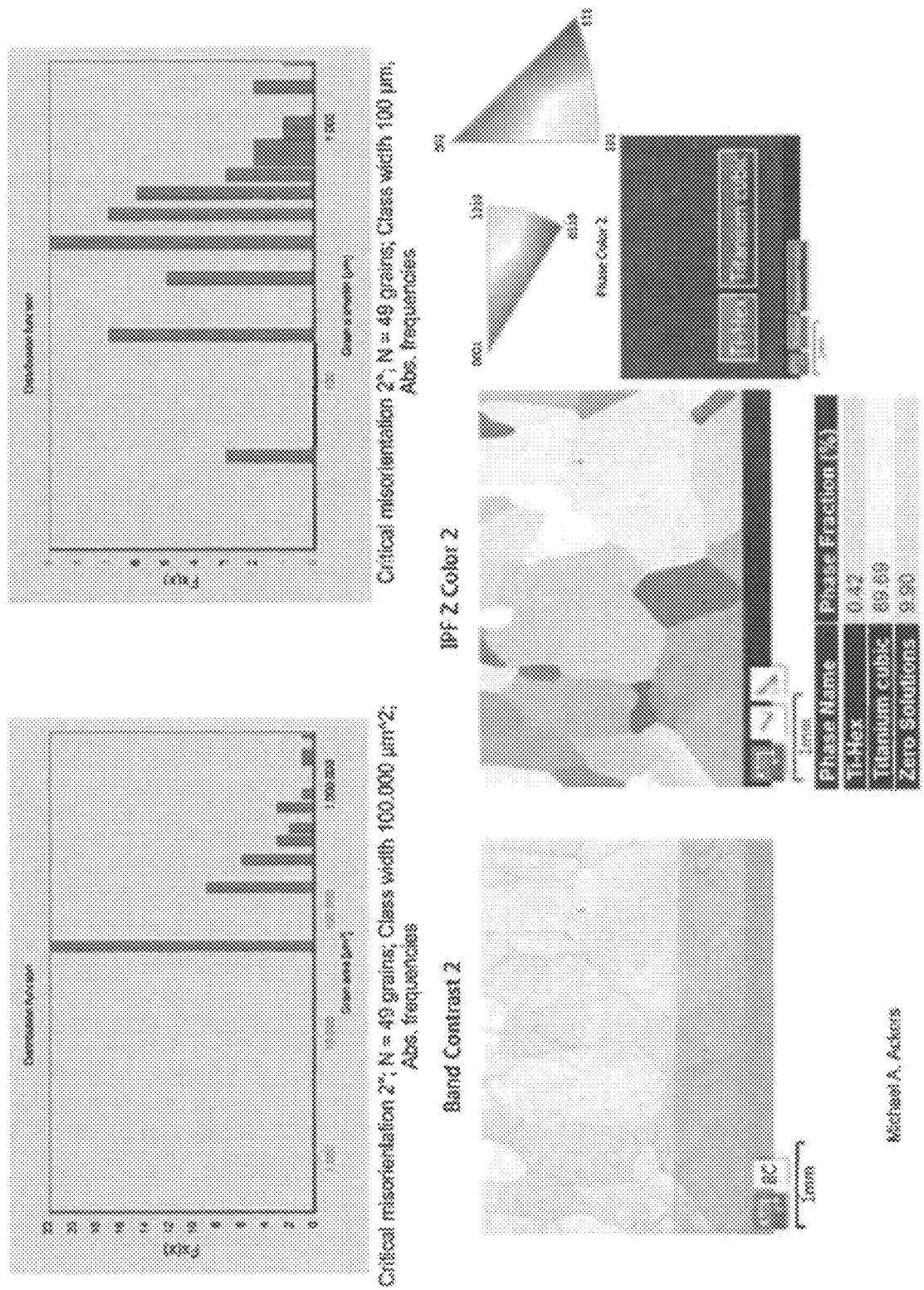
Figure 6: Microstructure of TTFS after arc melting conditions

TITANIUM ALLOYS FOR RAPID SOLIDIFICATION PROCESSING

Rapid solidification ($\Delta T \approx 10$ to $10^{10}$ K/s) of metallic melt occurs in many technical processes, such as powder atomization, welding, Additive Manufacturing (AM), casting, arc or plasma melting etc. The gradient causes non-equilibrium phases, segregation effects and residual stresses, which confines the choice of processable alloys. It is therefore an objective of the present invention to disclose two alloy systems, which surprisingly show an outstanding rapid solidification behavior.

In some applications fine grained powder (<1 mm) is needed. In other applications granular matter (comprising grains sizes ≥1 mm) is required. This might even be bulk goods. These are all powders in the sense of this specification.

The metal systems which the inventor found to show the best properties in terms of rapid solidification processability are Titanium (Ti)+Tantalum (Ta)+Iron (Fe)+Niobium (Nb)+Zirconium (Zr) and Ti+Ta+Fe+Tin (Sn).

In the following abbreviated as TTFNZ and TIFS:

BRIEF DESCRIPTION OF THE DRAWINGS

FIGS. 1 and 1b are graphs showing the thermodynamic equilibrium of TTFNZ.

FIGS. 2 and 2b are graphs showing the thermodynamic equilibrium of TTFS.

FIGS. 3 and 3b are images of the microstructure of TTFNZ.

FIGS. 4 and 4b are images of the microstructure of TTFS

FIG. 5 shows charts and images relating to the microstructure of TTFNZ.

FIG. 6 shows charts and images relating to the microstructure of TTFS.

DETAILED DESCRIPTION OF THE INVENTION

The thermodynamic equilibrium of TTFNZ and TTFS is shown in FIGS. 1, 1b and 2, 2b. The α/β Microstructure and phase composition of TTFNZ and TIFS after a rapid solidification process, (similar to 3D printing) is shown in FIGS.

| | | | | | | | | | | |
|---|---|---|---|---|---|---|---|---|---|---|
| Composition, wt. %: TTFNZ | | | | | | | | | | |
| Element | Ti | Ta | Nb | Fe | Zr | Preferably Sn | Si | O | N | C |
| Target | Balance | 6 | 8 | 4 | 6 | — | — | — | — | — |
| Range A Min. | Balance | 0.01 | 0.01 | 0.01 | 0.01 | Preferably 0.01 | 0.001 | 0.001 | 0.001 | 0.001 |
| Range A Max. | Balance | 15 | 25 | 15 | 15 | Preferably 10 | 3 | 0.3 | 0.2 | 0.9 |
| Range B Min. | Balance | 3 | 4 | 2 | 3, preferably 2 | Preferably 0 | 0.001 | 0.001 | 0.001 | 0.001 |
| Range B Max. | Balance | 10 | 12 | 6, preferably 10 | 9, preferably 10 | Preferably 10 | 3 | 0.3 | 0.2 | 0.9 |

| Property | Unit |
|---|---|
| Elastic modulus | <120 GPa, preferably <100 GPa, |
| Indent hardness | >300 HV |
| Density | <7 g/cm³ |

TTFNZ comprises only optionally Sn.

| | | | | | | | | |
|---|---|---|---|---|---|---|---|---|
| Composition, wt. %: TTFS | | | | | | | | |
| Element | Ti | Ta | Fe | Sn | Si | O | N | C |
| Target | Balance | 7 | 5 | 3 | — | — | — | — |
| Range A Min. | Balance | 0.01 | 0.01 | 0.01 | 0.008 | 0.001 | 0.001 | 0.001 |
| Range A Max. | Balance | 20 | 15 | 10 | 3 | 0.3 | 0.2 | 0.9 |
| Range B Min. | Balance | 3 | 2 | 0.1 | 0.008 | 0.001 | 0.001 | 0.001 |
| Range B Max. | Balance | 10 | 10 | 9 | 3 | 0.3 | 0.2 | 0.9 |

| Property | Unit |
|---|---|
| Elastic modulus | <120 GPa, preferably <115 GPa, |
| Indent hardness | >300 HV |
| Density | <7 g/cm³ |

3, 3b and 4, 4b. And the 13 dominated microstructure of TTFNZ and TTFS after arc melting conditions is shown in FIGS. 5 and 6.

The thermodynamic equilibrium of TTFNZ is shown in FIG. 1, 1b. The α/β microstructure of the alloy was confirmed using electron backscatter detector (EBSD) analysis for various conditions after rapid solidification (non-equilibrium) and/or finally accompanied by heat-treatment to achieve a near-equilibrium microstructure. The different microstructure produced by these processes are illustrated in FIG. 2, 2b, with the heat-treatment achieving a microstructure closer to the thermodynamic calculation.

This alloy shows, in the investigated processed windows, high compatibility with additive manufacturing processes, highlighted by the absence of cracks after processing.

The simulated thermodynamic equilibrium phase diagram of TTFS is shown in FIG. 2, 2b. The simulation was performed with a step size of 1 K. The alloy is in the liquid state at TS=1922 K (Matrix Formation Temperature) and transforms to 100% phase mole fraction of the solid cubic BCC_B2 phase at TS=1821 K. That leads to an equilibrium solidification interval of about TLS=101 K. After cooling to 1027 K, the hexagonal HCP phase nucleates (Beta-Alpha Transition Temperature) and is stabilized to a simulated temperature of 300 K to 92,88% phase mole fraction. At this temperature, the remaining phases are the rhombohedral p-Phase (Fe7Ta6) with a 4,3% phase mole fraction and the ordered intermetallic compound FeTi (BCC_B2 #2, cubic B2-type) with a solution of Ta. The precipitation of intermetallic phases, such as the μ-phase, or secondary phases such as the HCP_A3 (α-Phase) leads to an increase in the electrical resistance of the material; this leads to higher absorption of laser radiation, which can lead to a reduction in production costs of laser-based manufacturing processes.

The α/β microstructure of the alloy was confirmed using an electron backscatter detector (EBSD) analysis for various conditions after rapid solidification (non-equilibrium) and/or finally accompanied by heat-treatment to achieve a near-equilibrium microstructure. The different microstructure produced by these processes are illustrated in FIG. 6, with the heat-treatment achieving a microstructure closer to the thermodynamic calculation.

This alloy shows, in the investigated processed windows, high compatibility with additive manufacturing processes, highlighted by the absence of cracks after processing.

According to another aspect of the present invention, the novel materials could be interesting for aerospace, automotive, tooling or medical applications due to its high specific strength >200 kN·m/kg.

According to another aspect of the present invention, the novel materials could be interesting for aerospace, automotive, tooling, or medical applications, due to their low density, high toughness, excellent corrosion properties and their resistance against hot or cold cracking.

The metal systems TTFNZ and TTFS are especially suitable for medical applications. The most common implant materials (Ti64, CoCr, 316L) [1] have a relatively high corrosion resistance, but within human body fluid they are exposed to a very aggressive environment of dissolved oxygen, chlorides and proteins, which promote the release of Al-, Co-, Cr-, Ni-, V-, ions into the human body. The dissolved ions can disturb the cellular metabolism and lead to lethal tumorous diseases if trace amounts are exceeded. The best properties in terms of corrosion resistance and biocompatibility are achieved for Ti, Ta, Nb, Zr and their alloys. A further critical parameter of the alloys currently used for medical application is the mismatch of the elastic properties between the implant materials and the hard tissue. On this matter the presented metal systems TTFNZ and TTFS show a biocompatibility which is superior to established ISO [1] and ASTM standardized alloys. In particular, due to biocompatible alloying elements and the comparatively low elastic modulus (E<100 GPa, preferably <120 Gpa), the presented metal system TTFNZ should be preferred in clinical use; compared to established ISO [1] and ASTM standardized alloys. In particular, due to the biocompatible alloying elements and the comparatively low elastic modulus (E<115 GPa, preferably <120 GPa), the presented metal system TTFS should be preferred in clinical use; compared to established ISO [1] and ASTM standardized alloys.

Furthermore, common AM rapid solidification processing of TTFNZ and TTFS could empower tissue-engineered open porous, bone-mimicking lattice structures (scaffolds), which would allow the oxygenation and nutrition of bone cells, enabling osseointegration and a strong implant fixation.

According to another aspect of the present invention and regarding TTFS, it may be considered to add Tin (Sn; preferably 0.01-10 wt. %) to all existing titanium alloys in order to improve the common additive (AM) processability, in particular weldability or printability (AM). Because Sn can reduce the high surface tension and high melt viscosity, which could cause the balling effect during rapid solidification. In particular Sn can at the same time increase the absorption of laser radiation, which can lead to more cost-effective processing of titanium alloys.

In this case, Sn can be added as elemental powder to the pre-alloyed powder mixture or Sn can be alloyed directly to the pre-alloyed powder.

This specification was written focusing on powders. However, the one skilled in the art understands that there are additive manufacturing methods not based on powders but rather on wires or for example metal powder mixtures in liquid polymers. The materials as presented in the present specification may be used in such methods as well, which is as well an aspect of the present invention.

According to another aspect of the present invention, it may be considered to add Oxygen O, and/or Carbon C, and/or Nitrogen to TTFNZ and/or TTFS to create a hard, wear-resistant material.

In this invention an additive manufacturing method for the production of components is claimed comprising the steps of:
(a) providing and melting a metal based powder
(b) merging the molten particles with each other and with their underground thereby forming merged material
(c) cooling and thereby solidifying the merged material characterized in that the metal based powder is a Ti based powder comprising at least Ta, Fe and i) Sn and/or ii) Nb and Zr.

Preferably the method is characterized in that the Ti based powder comprises as well Si.

Preferably the method is characterized in that the Ti-based powder comprises C and/or N, and/or O.

In this invention a Ti based powder for additive manufacturing is claimed that is characterized in that the powder comprises:
Ta in the range of 0.01 wt % and 15 wt %, preferably in the range of 3 wt % and 10 wt % and most preferably is comprised with 6 wt % and
Nb in the range of 0.01 wt % and 25 wt %, preferably in the range of 4 wt % and 12 wt % and most preferably is comprised with 8 wt %

Fe in the range of 0.01 wt % and 15 wt %, preferably in the range of 2 wt % and 6 wt % and most preferably is comprised with 4 wt %

Zr in the range of 0.01 wt % and 25 wt %, preferably in the range of 3 wt % and 9 wt % and most preferably is comprised with 6 wt %.

In this invention a Ti based powder for additive manufacturing is claimed that is characterized in that the powder comprises:

Ta in the range of 0.01 wt % and 20 wt %, preferably in the range of 3 wt % and 10 wt % and most preferably is comprised with 7 wt % and Fe in the range of 0.01 wt % and 15 wt % preferably in the range of 2 wt % and 10 wt % and most preferably is comprised with 5 wt %

Sn in the range of 0.01 wt % and 10 wt % preferably in the range of 0.1 wt % and 9 wt % and most preferably is comprised with 3 wt %

Si in the range of 0.001 wt % and 3 wt %.

Preferably the Ti based powder is characterized in that the powder comprises:

Oxygen, preferably in the range of 0.001 wt % and 0.3 wt %, and/or

Nitrogen, preferably in the range of 0.001 wt % and 0.2 wt %, and/or

Carbon, preferably in the range of 0.001 wt % and 0.9 wt %.

For some of the Ti based powders as described above the metals added to Ti lead to a faster solidification of the merged material the powder compared to the solidification of Ti based powder comprising only Ti as metallic element. In some of these cases this can be explained by an increase of the melting point of the merged material as compared to pure Ti. A higher melting point leads to a larger temperature gradient between the solidifying melt and the surrounding medium during cooling, which leads to faster solidification. Faster in this context means that the solidification is at least 1K/s faster.

KEY LITERATURE

[1] ISO 5832, Implants for surgery—Metallic materials

The invention claimed is:

1. A Ti based powder for additive manufacturing, comprising:
    3 wt % to 10 wt % Ta
    4 wt % to 12 wt % Nb
    2 wt % to 10 wt % Fe
    3 wt % to 9 wt % Zr
    wherein Ti is used as a balance of the composition.

2. The Ti based powder according to claim 1, wherein the powder comprises at least one of the group consisting of Oxygen, Nitrogen, and Carbon.

3. The Ti based powder according to claim 2, wherein the powder comprises 0.001 wt % to 0.3 wt % Oxygen.

4. The Ti based powder according to claim 2, wherein the powder comprises 0.001 wt % to 0.2 wt % Nitrogen.

5. The Ti based powder according to claim 2, wherein the powder comprises 0.001 wt % to 0.9 wt % Carbon.

6. An additive manufacturing method for producing components, comprising the steps of:
    (a) providing and melting a metal based powder, resulting in molten particles;
    (b) merging the molten particles with each other and with their underlying layer thereby forming a merged material; and
    (c) cooling and thereby solidifying the merged material, wherein the metal based powder is the Ti based powder according to claim 1.

7. The method according to claim 6, wherein the Ti based powder further comprises Si.

8. The method according to claim 6, wherein the Ti-based powder comprises at least one of the group consisting of C, N, and O.

9. A Ti based powder for additive manufacturing, comprising:
    3 wt % to 10 wt % Ta
    2 wt % to 10 wt % Fe
    0.1 wt % to 9 wt % Sn
    0.001 wt % to 3 wt % Si
    wherein Ti is used as a balance of the composition.

10. The Ti based powder according to claim 9, wherein the powder comprises at least one of the group consisting of Oxygen, Nitrogen, and Carbon.

11. The Ti based powder according to claim 10, wherein the powder comprises 0.001 wt % to 0.3 wt % Oxygen.

12. The Ti based powder according to claim 10, wherein the powder comprises 0.001 wt % to 0.2 wt % Nitrogen.

13. The Ti based powder according to claim 10, wherein the powder comprises 0.001 wt % to 0.9 wt % Carbon.

14. An additive manufacturing method for producing components, comprising the steps of:
    (a) providing and melting a metal based powder, resulting in molten particles;
    (b) merging the molten particles with each other and with their underlying layer thereby forming a merged material; and
    (c) cooling and thereby solidifying the merged material, wherein the metal based powder is the Ti based powder according to claim 5.

15. The method according to claim 14, wherein the Ti-based powder comprises at least one of the group consisting of C, N, and O.

* * * * *